United States Patent [19]
Cramer

[11] Patent Number: 5,918,679
[45] Date of Patent: Jul. 6, 1999

[54] FIRE SAFETY SYSTEM

[76] Inventor: Frank B. Cramer, 14800 Alexander St., Mission Hills, Calif. 91345

[21] Appl. No.: 08/949,422

[22] Filed: Oct. 14, 1997

[51] Int. Cl.$^6$ .................................................. A62C 2/00
[52] U.S. Cl. .................................. 169/45; 169/12; 169/62
[58] Field of Search .................................. 169/9, 11, 12, 169/26, 46, 45, 62, 84; 149/61, 19.1; 252/2, 3, 4, 5, 6, 7

[56] References Cited

U.S. PATENT DOCUMENTS

| | | | |
|---|---|---|---|
| 633,807 | 9/1899 | Clayton | 169/12 |
| 3,590,559 | 7/1971 | Bragg et al. | |
| 3,777,928 | 12/1973 | Kober | 220/88 |
| 3,830,307 | 8/1974 | Bragg et al. | |
| 3,856,087 | 12/1974 | Wartes | 169/45 |
| 4,669,548 | 6/1987 | Colodner et al. | 169/12 |
| 5,423,384 | 6/1995 | Galbraith et al. | |
| 5,425,886 | 6/1995 | Smith | 252/5 |
| 5,449,041 | 9/1995 | Galbraith | |

*Primary Examiner*—Andres Kashnikow
*Assistant Examiner*—David Deal
*Attorney, Agent, or Firm*—Knobbe, Martens, Olson & Bear LLP

[57] ABSTRACT

A system for preventing and suppressing fires and explosions is provided that fills the ullage spaces in fuel tanks with an inert gas that is generated by the operating system or facility. This insert gas is a combustion gas that is depleted of readily combustible oxygen and that is supplied at a pressure exceeding the ambient and displaces any oxygen in the ullage to a level that inhibits combustion in the fuel tank.

14 Claims, 1 Drawing Sheet

5,918,679

FIRE SAFETY SYSTEM

Field of the Invention

This invention relates to fire safety systems that suppress fire initiation and inhibit propagation of combustion in vehicles and facilities that use combustible fuels.

BACKGROUND OF THE INVENTION

Many vehicles use internal combustion engines to operate, whether the engines are piston, rotary or turbine engines. These vehicles include automobiles, trucks, trains, airplanes, ships and boats. All of these vehicles require highly combustible fuel in the form of gasoline, kerosene, fuel oil, petroleum products or other combustible fuels, and those fuels present a safety hazard. The fuel is often contained in a fuel tank which contains a large amount of air as the tank empties. Evaporation of the fuel into the fuel tank ullage presents a large air to fuel ratio that enhances the possibility of combustion.

These engines and fuels are also used with stationary facilities such as power generation plants, petroleum refineries, co-generation facilities and manufacturing plants that use petroleum based fuels to activate equipment or produce flammable fluids. For these stationary facilities, the use of the flammable fuels also presents a safety hazard. Additionally, the storage of fuel for these facilities presents a large concern because the storage tanks containing flammable liquid are often large and as the tank empties a large volume of fuel evaporates into the larger ullage of the storage tank presenting the likelihood of a more powerful explosion if the fuel in the tank is ignited.

There is thus a need for a method and apparatus to reduce the risk of igniting the fuel in the fuel storage tanks, and to do so economically.

SUMMARY OF THE INVENTION

This invention provides an inert gas to displace the air that would otherwise occupy the ullage in a fuel storage tank resulting in an environment that is not conducive to combustion as there is no free oxygen to support combustion. This inert gas advantageously comprises burnt gas in the form of gases from a previously combusted mixture that has been cooled to an appropriate temperature, that has the water removed, that has any sparks removed, and that is provided at a pressure suitable to the fuel storage tank. The burnt gas can be provided by taking a portion of the exhaust from the combustion engine associated with the fuel storage tank, or the burnt gas can be provided by the exhaust of a separate engine or even provided by a micro-combustor designed solely to provide burnt gas for the ullage of the storage tanks.

The burnt gas provides a source of inert gas that is much less expensive than using inert gases such as pure carbon dioxide or nitrogen, or the nobel gases like helium or argon, and a source of gas that is occupies considerably less space and requires less weight than the bulk and weight of the storage tanks used for storing such inert gases. The burnt gas also provides a large volume of gas that is not practically available with inert gases. The inert combustion gas is advantageously sufficiently depleted of oxygen that combustion is inhibited, or if combustion is underway—to suppress the combustion.

There is thus advantageously provided method and apparatus for a fire control system having an engine that burns fuel and generates combustion gases containing an insufficient amount of oxygen to support combustion. A first line is placed in fluid communication with the combustion gasses to extract those gases from the engine. A heat exchanger is placed in fluid communication with the line to reduce the temperature of the combustion gases to a first predetermined level. A separator is placed in fluid communication with the heat exchanger to remove water from the combustion gases leaving the heat exchanger. A reservoir is placed in fluid communication with the separator to hold the combusted gases. A storage tank is placed in fluid communication with the reservoir so the combusted gases can enter any ullage of the storage tank.

Advantageously, at least one pressure regulator valve is placed in fluid communication with the combustion gases to reduce the pressure of the combustion gases to a predetermined level. Further, a second heat exchanger may be placed in fluid communication with the separator to further reduce the temperature of the combustion gases to a second predetermined level. In further embodiments, a desiccant chamber may be placed in fluid communication with the combustion gases to remove moisture from the combustion gases. Advantageously the storage tank comprises a fuel tank for the engine, and the engine comprises an combustion engine. A turbine is suitable for the source of the inert combusted gases.

DETAILED DESCRIPTION OF THE PREFERRED EMBODIMENT

Figure 1:
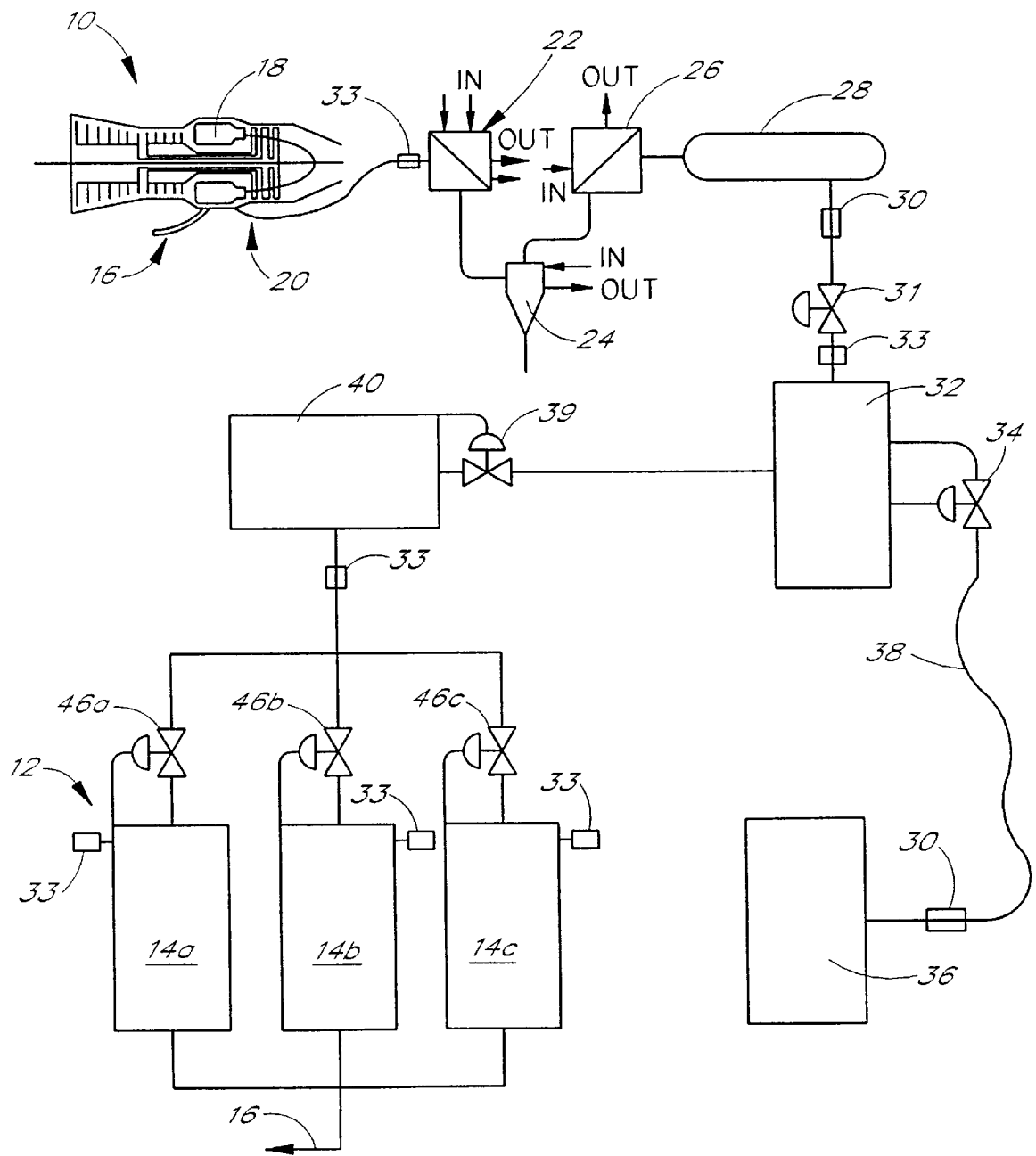
FIG. 1 is a schematic view of a system of this invention for providing burnt gas to a fuel storage tank.

Referring to FIG. 1, a combustion powered engine, such as an internal combustion engine or a turbine 10 is provided with fuel from a fuel storage system 12 comprising one or more fuel tanks 14a, 14b etc., through fuel inlet line 16. Fuel is burned or combusted in one or more chambers, such as combustors 18. A portion of the resulting combustion gases is withdrawn from the turbine 10 through outlet line 20 at locations selected so that the withdrawn gases lack sufficient oxygen to support combustion. For longevity and improved performance the line 20 may advantageously be cooled, for example, by air cooling or possibly by liquid cooling. The combustion gases are advantageously about 2–10 time atmospheric pressure and at or near the temperature of stoichiometric combustion when the source of the combustion gases comprises a turbine. The specific temperature, pressure and gas composition will vary with the source of the combustion gases.

The outlet line 20 is in fluid communication with a heat exchanger 22 that lowers the temperature of the combustion gases. If a single heat exchanger is used, it advantageously lowers the temperature to about 2° to 10° C. At these temperatures 98 to 99% of the moisture will be removed from the combusted gases and these relatively dry inert gases will be satisfactory for use in many storage tanks, reactors, pipelines and for fire suppression discharge systems. The heat exchanger 22 advantageously does not freeze the water in those applications where it would be more difficult to dispose of the frozen water than to dispose of liquid water. As appropriate, a heater could be provided to prevent freezing. The heating may be achieved by an electric heating element or by a supply of a warming fluid from a vehicle's heating system. Exemplary heat exchangers 22 are typically made of high thermal conductive metal such as copper of aluminum.

A separator 24 is in fluid communication with the heat exchanger 22 to receive the cooled, combusted gas and separate water from the gas. The separator 24 may condense the water out of the gas and may lower the temperature of the gas in the process. The phase separator may also comprise one of the conventional phase separating techniques including a cyclone separator and path interrupters, baffle plates, some high surface packing or other known separation techniques to separate the liquid from the combusted gases and discharging the condensed liquids.

The separators may also advantageously be designed with discharge means to periodically eject the accumulation of liquid water occurring during the phase separation processes. This discharge will only allow the escape of the liquid water and not of the combustion gases from which the water has been removed. The gases may be passed through additional separators to remove other combustion products that are deemed undesirable for the intended use of the combusted gas, such as carbon monoxide.

From the phase separator 24, if the temperature of the combusted gases is undesirably high, the combusted gases may pass to a second heat exchanger 26 in fluid communication with the phase separator 24 or first heat exchanger 22, in order to further reduce the temperature of the combusted gas. The second heat exchanger 26 is used only as needed, and its design depends in large part upon the temperature of the exhaust gas from the engine 10, the extent to which the first heat exchanger 22 reduce the temperature and the temperature at which the combusted gas must be provided to the reservoir 32 and the fuel tanks 14.

For use in aircraft, for example, it may be advantageous to use two heat exchangers 22 and 26. In the event two heat exchangers 22, 26 are used, the first heat exchanger 22 advantageously reduces the combustion gases to "ground level ambient" temperature and condenses about 80–95% of the water content from these gases. The coolant may be from air flows regulated to bring the inert gas temperatures down to the range of 2–30° C. The second heat exchanger may condense from 90–98% of the water content of the combustion gases at the operating conditions and altitudes of common use in commercial passenger aircraft.

Further, if the ambient temperature at takeoff of the aircraft is 30° C. or over, a supplemental cooling system may be needed, as in the second heat exchanger 26. The second heat exchanger 26 may take advantage of the relatively colder upper atmosphere temperature accessible to an aircraft to "freeze out" much of the remaining water in the combustion gases. The heat exchangers 22, 26 may be fuel or air cooled if used on vehicles traveling at a sufficient speed, or having fuel reservoirs of sufficient size.

Depending on the application, from the heat exchanger 26 or the separator 28, the combusted gases are taken to either a reservoir tank 32 in fluid communication with the exchanger 26 through valve 30, or to a desiccant chamber 28 containing a disposable or renewable dehydrating agent. For some applications, such as an airplane, a desiccant chamber 28 is placed in fluid communication with heat exchanger 26, to remove water from the combusted gas during transition periods such as when the airplane has not yet reached freezing altitudes to where an air operated second heat exchanger 26 functions adequately.

The secondary heat exchanger 26 and desiccant chamber 28 thus provide great flexibility to ensure that sufficient water is removed from the combustion gases in order to meet the performance criteria of a wide variety of applications. Further, the use of a dry system to remove moisture from the inert combustion gases offers additional flexibility.

The combusted gases exit the desiccant chamber 28 through a quick disconnect valve 30 that is advantageously interposed in the fluid communication line in order to allow the system to be disconnected. Such quick disconnect valves 30 may be used where deemed appropriate to allow ready separation of source of the inert combustion gas from distribution system, or to allow components such as desiccant chamber 28 to be readily removed and exchanged. In the embodiment of FIG. 1, the quick disconnect valve 30 is interposed between the desiccant chamber 28 and storage reservoir 34, along with a pressure regulator valve (PRV) 31. The PRV 31 regulates the pressure of the gases to the main pressure reservoir from the source of combustion gases 10.

In the airplane configuration, the combusted gases are then passed to a reservoir tank 32 in fluid communication with the valve 30 and desiccant chamber 28. The reservoir tank 32 is in fluid communication through another pressure regulator valve (PRV) 34 to a ground based source 36 of combusted gas, through umbilical 38. The ground based source 36 also provides combusted gas at temperature lower than the combustion temperature and with moisture removed. The ground based source 36 provides gases to reservoir 32 while the engines of the plane are not operating and are thus incapable of providing the inlet combustion gases. When the airplane engines provide the requisite gases the ground based source 36 can be disconnected.

The PRV 31 regulates the pressure of the gases to the main pressure reservoir from the source of combustion gases 10. The main pressure reservoir 32 is advantageously maintained at pressures between two and ten atmospheres above ambient, although lower pressures may be suitable for tanks that are not designed to be pressurized with inert gases. The volume and the pressure of the main reservoir 32 is such as to comfortably accommodate normal flow rates, changes in flow rates and for the emergency use of inert gases to suppress flames or combustion in emergencies of line and/or equipment breaks with fuel discharges. Such design parameters will take into account historical records of accidents in these types of facilities. The reservoir 32 may be of aluminum alloy, stainless steel, plastic, or fiber glass composite. The particular material will be selected according to the demands of the particular application.

The reservoir 32 is also in fluid communication with one or more fuel tanks, illustrated in FIG. 1 as tanks 14a–14c. As further illustrated in FIG. 1, reservoir tank 32 is in fluid communication with a secondary distribution tank 40, with a PRV valve 39 interposed between the reservoir tank 32 and secondary tank 40. The combusted gases are delivered through PRV 39 to distribution reservoir 40 which is maintained at a pressure only slightly greater than the fuel tanks 40 to which the inert combusted gas is to be delivered. The volume and pressure for the distribution reservoir 40 will be designed to accommodate the amount and range of flow rates expected from the assortment of recipient fuel tanks.

The distribution tank 40 is in fluid communication with one or more fuel tanks 14, with a PRV 46a–46c interposed between the secondary tank 40 and each individual fuel tank 14. The fuel tanks 14 are in turn are connected to the engine 10 to provide fuel to the engine. The inert combustion gases are fed to the fuel tanks 14 via PRV 46a–46c to develop a pressure in the ullage space of the tanks 14 on the order of 2% to 25% over the ambient pressure. Thus, the contents of these fuel tanks 14 are maintained continuously in a no-flammable/non-explosive state. When a tank 14 is being refilled, the surplus inert combustion gas in the reducing ullage space may be pumped back to either the main reservoir or the distribution tanks for reuse, or vented to atmosphere with appropriate safeguards for the vented gas.

Suitable temperature sensors, flow meters, flow control valves, pressure valves and pressure sensors are located between the engine 10 and the fuel tanks 14 to regulate the temperature, pressure and flow rate of the gas provided to the tanks 14. Thus, for example, suitable flow meters and pressure meters 33 will be interposed at suitable locations between the engine 10, the storage reservoir 32, secondary storage tank 40 and fuel tanks 14 to determine and control the amount of combusted gases provided to reservoirs and tanks 32, 40 and 14.

The combusted gases taken from the engine 10 have a composition that does not support combustion and thus provides an inert gas that inhibits combustion when that gas is placed in the ullage of the fuel tanks 14. Because the combusted gases are hot as they exit the engine 10, one or more heat exchangers 22, 26 are used to lower the temperature to a level suitable for the particular storage tanks 32, 40 and fuel tanks 14. Because the combusted gases contain water vapor, a drying mechanism such as separator 24 or desiccant chamber 28 is used to take the water out of the gas in order to prevent moisture from accumulating in the fuel tanks 14. The pressure is adjusted depending on the source of the combusted gas and the pressure desired for the fuel tanks 14, as well as any need to compensate for variable pressure as would be appropriate for airplanes that change pressure with the altitude.

As appropriate for specific applications, other components of the combustion gases may be removed by means known to one of skill in the pertinent art having knowledge of the present disclosure. Thus, for example, carbon monoxide may be removed from the combustion gases if the inert gas system of this invention is used with aircraft, in order to further ensure carbon monoxide poisoning presents no danger.

The above described embodiment is suitable for use with internal combustion engines usable on ships, ship holds, airplanes, vehicles, trains, tank trucks, air tankers, ship holds and other moveable things. But the same components can be used with stationary facilities, such as refineries and power generation plants, which produce combusted gases and have tanks containing flammable fluids with ullage in the tanks. Other stationary applications include tank farms, product tanks, reaction vessels and flow lines, or other applications where there is a large ullage in tanks containing flammable liquids, where it is advantageous to have the ullage filled with inert gas.

In most stationary facilities there is some kind of a combustor providing energy for the facility. The products of this combustor will provide the combustion gas source for the facility or function. The combustion gas is collected, cooled, pressure adjusted, the water condensed and removed and the cooled, dry, combusted gas conducted to the ullage space over the fuel or flammable material in the particular container of concern. In a further embodiment, a source of combustion gases may be used primarily for, or even solely dedicated to, producing inert combustion gases for use as described herein. This primarily or solely dedicated source of inert combustion gases will be referred to herein as a micro-combustor. The ground based source of combustion gases 36, is one example of a use of a micro-combustor.

Depending on the source of the combusted gases, the particular location at which the gas is extracted from the source may vary. Advantageously the gas is extracted at a location that does not unacceptably degrade performance of the engine 10 or other source of combusted gas. Advantageously, the combusted gas is acquired from the engine 10 at a location that produces gas near stoichiometric conditions. If the engine 10 comprises a turbine, the gas may be extracted from the combustor 18 downstream, but advantageously not at a location where air is mixed with the combusted gases as that mixing would introduce oxygen and lessen the inertness of the combusted gases. Because the source of the combusted gas is typically above atmospheric pressure, only pressure reduction regulators are required, which eliminates the more complex equipment and methods needed to increase the pressure.

The above descriptions are for supplying inert combustion gas to ullage in a fuel storage container to inhibit ignition or combustion. The same method and apparatus could be used to supply inert combustion gases to suppress combustion when it is detected in undesirable locations, by merely providing a fluid communication from the reservoir 32 or tank 40 opening into such locations through suitable valves and controls. If an undesirable flame or combustion is detected then the inert gas can be channelled through the fluid communications to the location of the flame or combustion in order to deplete the oxygen and stop the combustion.

There is thus advantageously provided a method and apparatus for inhibiting combustion by providing an inert combustion gas. Advantageously the inert combustion gas is supplied to fuel tank ullage space. The method and apparatus are applicable to either, or both moveable vehicles and stationary facilities. The inert gas may be applied to a variety of applications that have flammable liquid in a container, where it is advantageous to provide an inert gas to the ullage in the container. Such applications include chemical/petrochemical facilities, gas stations and other fuel handling facility, pipelines etc.

There is thus advantageously provided a system for preventing and suppressing fires and explosions is provided that fills the ullage spaces in fuel tanks with an inert gas that is generated by the operating system or facility. This insert gas is a combustion gas that is depleted of readily combustible oxygen and that is supplied at a pressure exceeding the ambient and displaces any oxygen in the ullage to a level the flammability limits of the fuel tank.

The above described embodiments of the invention have been illustrated and described with reference to the accompanying drawings. Those skilled in the art will understand that these preferred embodiments are given by way of example only. Various changes and modifications may be made without departing from the scope and spirit of the invention.

What is claimed is:

1. A fire control system, comprising:
   an engine that burns fuel and generates combustion gases containing an insufficient amount of oxygen to support combustion; p1 a first line in fluid communication with the combustion gases to extract those gases from the engine;
   a heat exchanger in fluid communication with the line to reduce the temperature of the combustion gases to a first predetermined level;
   a separator in fluid communication with the heat exchanger to remove water from the combustion gases leaving the heat exchanger;
   a reservoir in fluid communication with the separator to hold the combusted gases; and
   a storage tank in fluid communication with the reservoir so the combusted gases can enter any ullage of the storage tank.

2. A fire control system as defined in claim 1, further comprising at least one pressure regulator valve in fluid communication with the combustion gases to reduce the pressure of the combustion gases to a predetermined level.

3. A fire control system as defined in claim 2, further comprising a second heat exchanger in fluid communication with the separator to further reduce the temperature of the combustion gases.

4. A fire control system as defined in claim 2, further comprising a desiccant chamber in fluid communication with the combustion gases to remove moisture from the combustion gases.

5. A fire control system as defined in claim 2, wherein the storage reservoir comprises a fuel tank for the engine.

6. A fire control system as defined in claim 2, wherein the engine comprises an internal combustion engine.

7. A fire control system as defined in claim 2, wherein the engine comprises turbine.

8. A method of fire control, comprising the steps of:

burning fuel to generate combustion gases containing an insufficient amount of oxygen to support combustion;

removing at least a portion of the combustion gases and placing those removed combustion gases in fluid communication with a heat exchanger and reducing the temperature of the combustion gases to a first predetermined level;

placing the reduced temperature combustion gases in fluid communication with a separator to remove water from the combustion gases;

placing a reservoir in fluid communication with the separator to hold the combusted gases in the reservoir; and placing a storage tank in fluid communication with the reservoir so the combusted gases enter any ullage of the storage tank and displace the air to provide an environment that is not conducive to combustion.

9. A method of fire control as defined in claim 8, comprising the further step of placing at least one pressure regulator valve in fluid communication with the combustion gases to reduce the pressure of the combustion gases to a predetermined level.

10. A method of fire control as defined in claim 9, comprising the further step of placing a second heat exchanger in fluid communication with the separator to further reduce the temperature of the combustion gases.

11. A method of fire control as defined in claim 8, comprising the further step of placing a desiccant chamber in fluid communication with the combustion gases to remove moisture from the combustion gases.

12. A method of fire control as defined in claim 8, wherein the storage reservoir comprises a fuel tank for the engine and further comprising the step of placing the fuel tank in fluid communication with the engine to provide fuel to the engine.

13. A method of fire control as defined in claim 8, wherein the combustion step comprises the step of combusting the fuel in an internal combustion engine.

14. A method of fire control as defined in claim 8, wherein the combustion step comprises the step of combusting the fuel in a turbine.

* * * * *